June 3, 1958     R. F. HERR     2,837,159
METHODS OF AND APPARATUS FOR CUTTING STRIP MATERIAL
Filed May 21, 1954     4 Sheets-Sheet 1
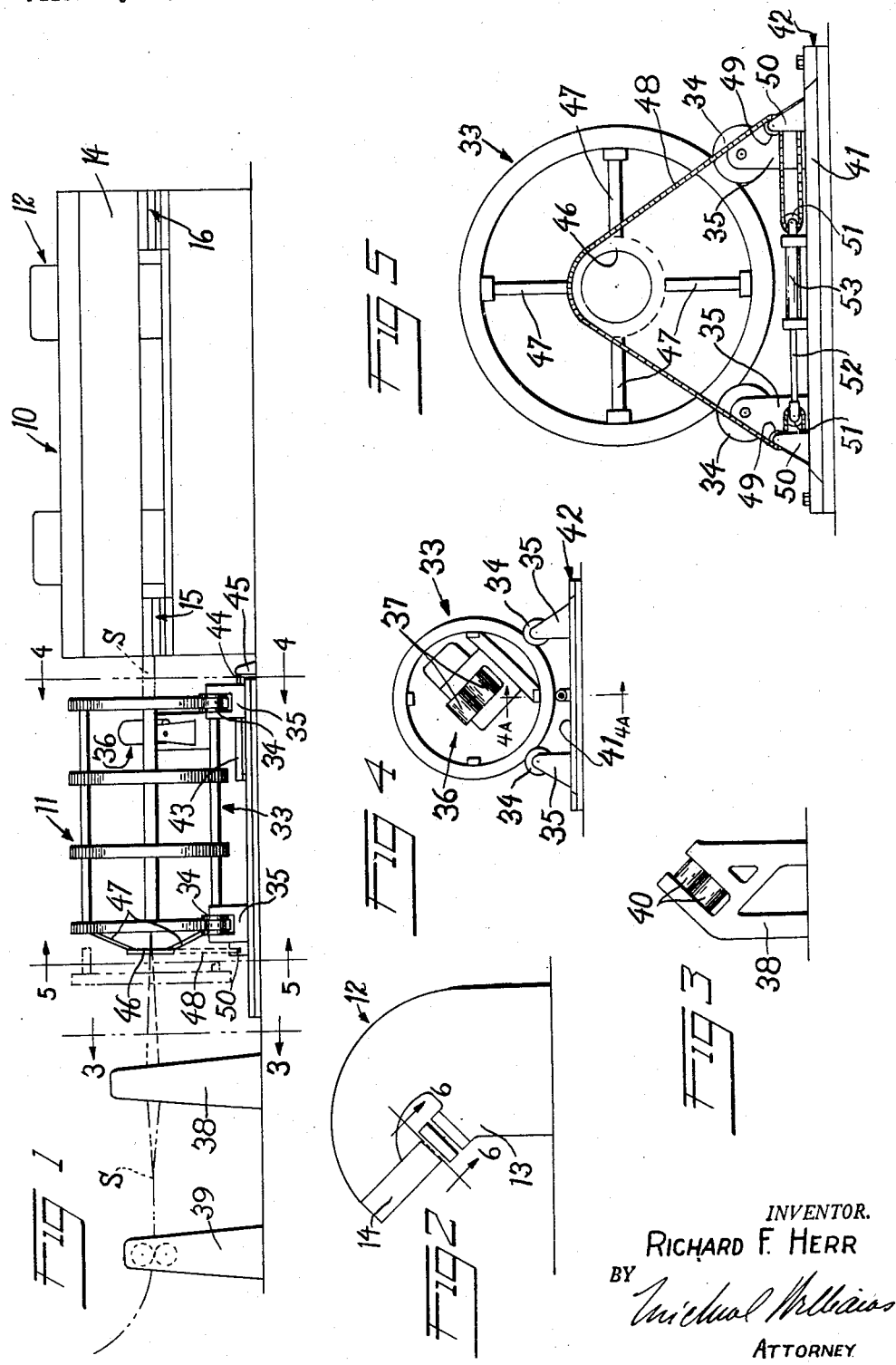
INVENTOR.
RICHARD F. HERR
BY
ATTORNEY

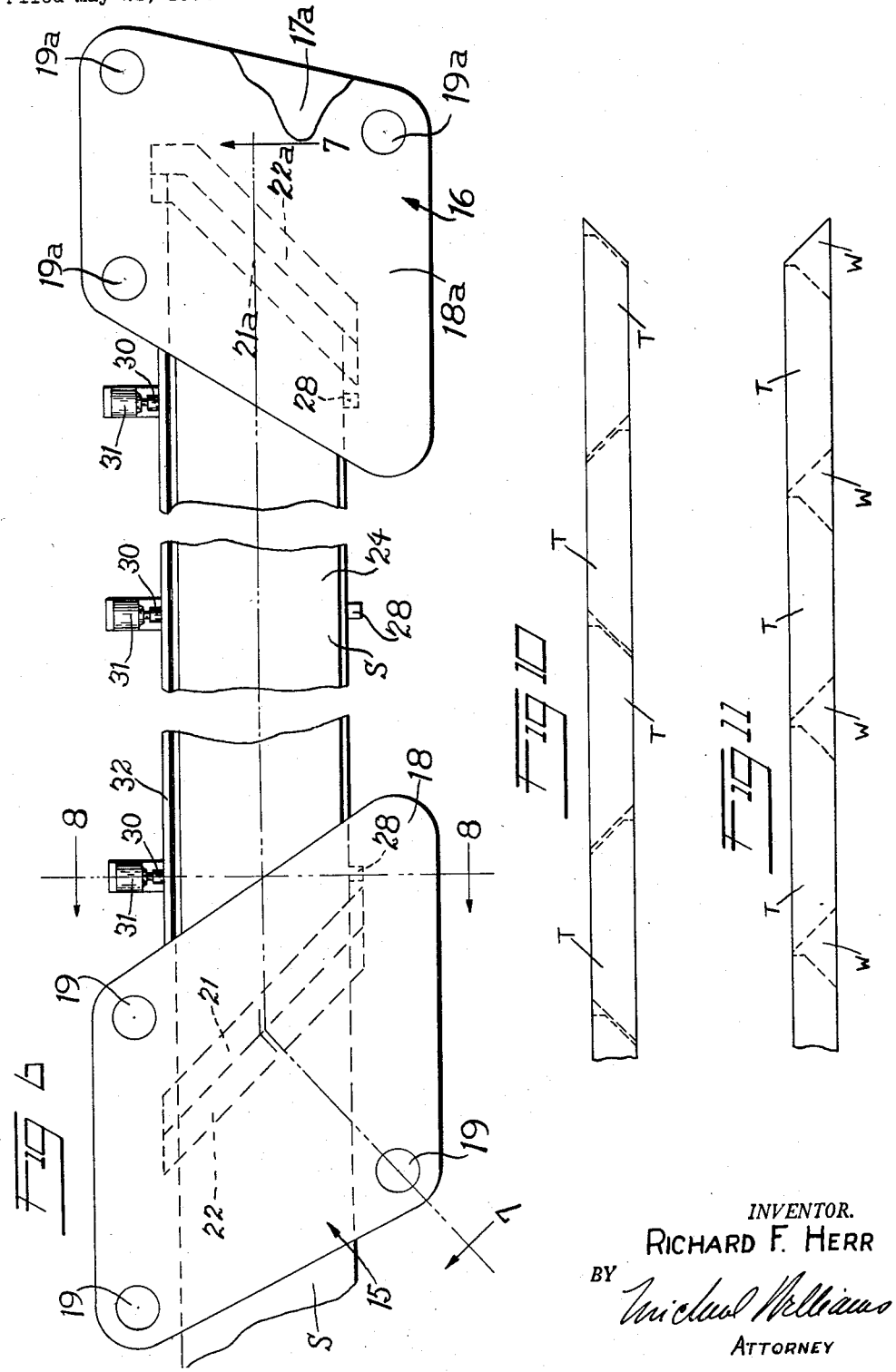

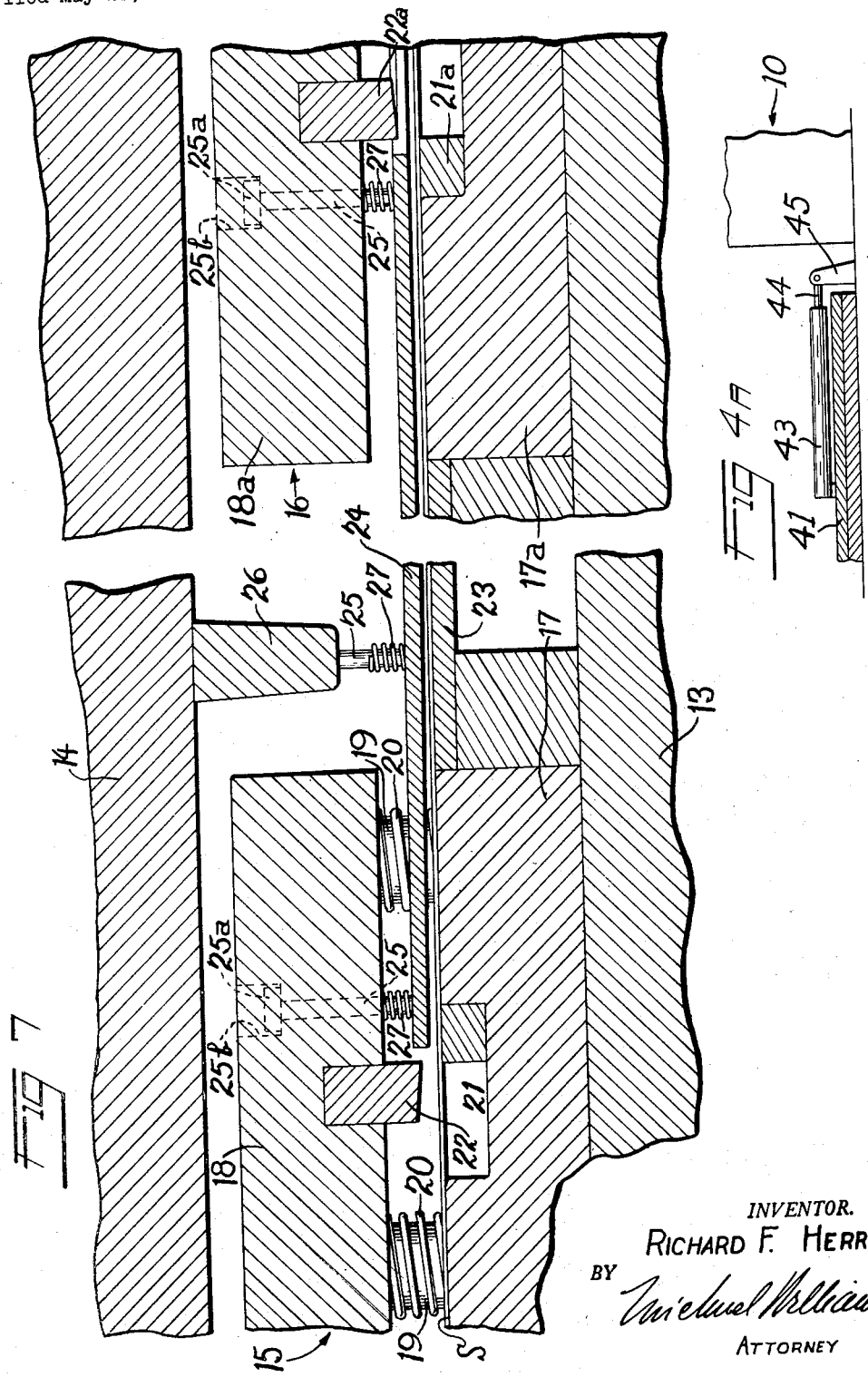

June 3, 1958 R. F. HERR 2,837,159
METHODS OF AND APPARATUS FOR CUTTING STRIP MATERIAL
Filed May 21, 1954 4 Sheets-Sheet 4
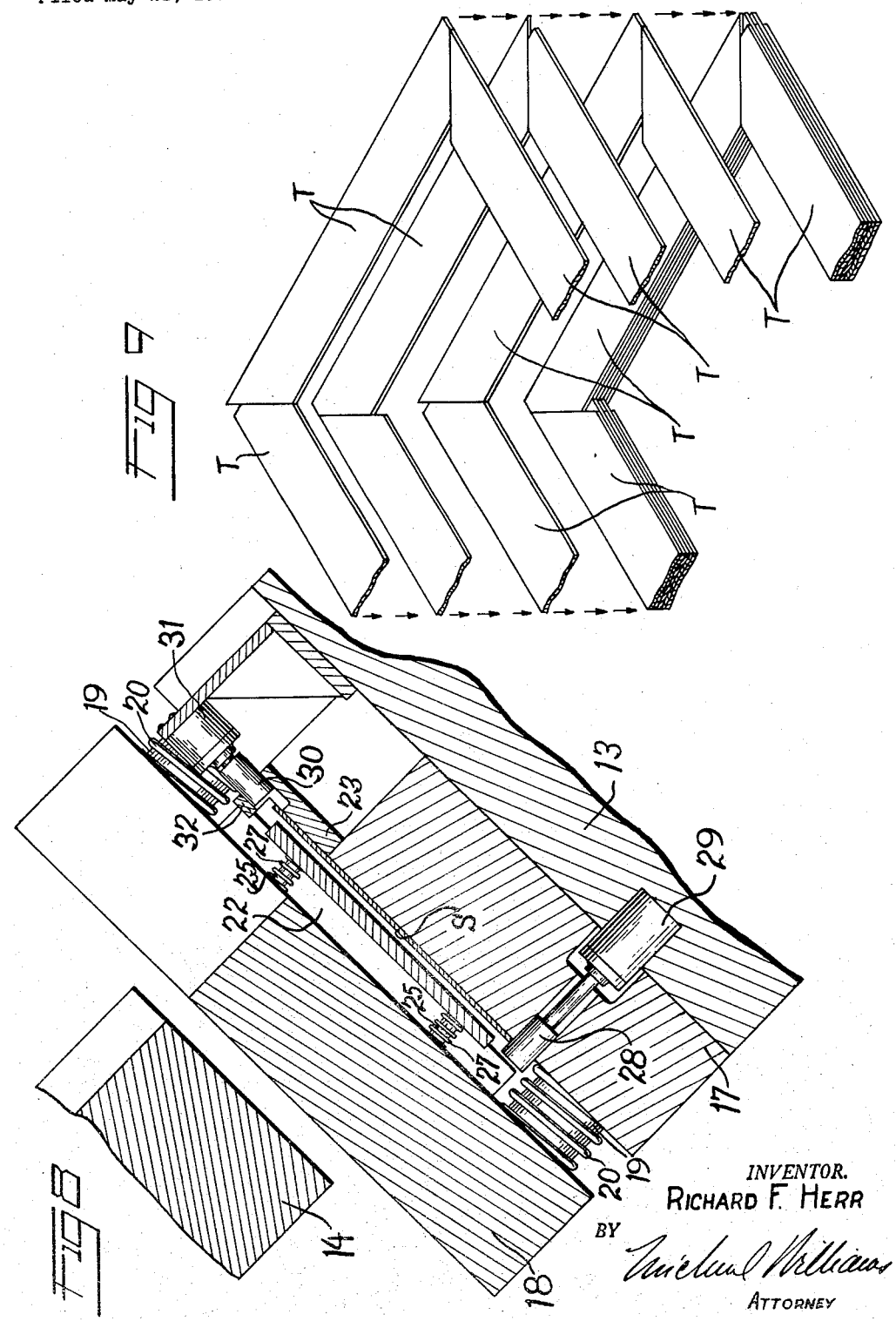
INVENTOR.
RICHARD F. HERR
BY
ATTORNEY

United States Patent Office 2,837,159
Patented June 3, 1958

2,837,159

METHODS OF AND APPARATUS FOR CUTTING STRIP MATERIAL

Richard F. Herr, Warren, Ohio, assignor to The Herr Equipment Corporation, Warren, Ohio, a corporation of Ohio Application May 21, 1954, Serial No. 431,551

11 Claims. (Cl. 164—49)

The present invention relates to material cutting, more particularly to methods of and apparatus for severing strip material to form transformer laminations, and the principal object of my invention is to provide new and improved methods and apparatus of the character described.

In cutting laminations for use in building large electrical transformers, several difficult problems are presented. One of the problems is due to the fact that the abutting edges of respective adjoining laminations must fit together as nearly perfect as possible in order to provide an efficient, quiet transformer. It will be appreciated that cutting the laminations from relatively thin strip with the requisite degree of accuracy, particularly when each lamination may be of considerable length, is extremely difficult.

Moreover, the strip material from which the laminations are cut is very expensive since it is made by a special process which results in a specified grain structure orientated in a specified manner. Accordingly, when cutting transformer laminations, scrap must be held to an absolute minimum since such scrap results in losses which are quite high in view of the large tonnages of laminations which are cut.

One of the prior art solutions to the problem of minimizing scrap, particularly when cutting keystone shaped laminations, is mounting one or more of the cutting dies so that it may be shifted to reverse its cutting angle relative to the longitudinal axis of the strip intermediate each cutting operation. However, this prior art solution has not been satisfactory since the use of shiftably mounted dies results in inaccuracies in cutting the laminations.

While my invention is not limited to cutting transformer laminations from the strip material, it employs a novel method and apparatus which is particularly appropriate in solving the problems heretofore mentioned; and these advantages together with others will become apparent from a study of the following description and from the drawings appended hereto.

In the drawings accompanying this specification and forming a part of this application there is shown, for purpose of illustration, an embodiment which my invention may assume, and in these drawings:

Figure 1 is a side elevational view of apparatus embodying my invention,

Figure 2 is an end elevational view of the apparatus shown in Figure 1,

Figure 3 is an elevational view corresponding to the line 3—3 of Figure 1,

Figure 4 is an elevational view corresponding to the line 4—4 of Figure 1,

Figure 4A is a sectional view generally corresponding to the line 4A—4A of Figure 4, Figure 5 is an enlarged sectional view generally corresponding to the line 5—5 of Figure 1, Figure 6 is an enlarged broken fragmentary view generally corresponding to the line 6—6 of Figure 2, Figure 7 is a still further enlarged fragmentary sectional view generally corresponding to the line 7—7 of Figure 6, Figure 8 is a fragmentary sectional view drawn to the same scale as Figure 7 and generally corresponding to the line 8—8 of Figure 6, Figure 9 is a fragmentary, exploded perspective view of a transformer core, Figure 10 is a reduced size plan view illustrating the manner in which transformer laminations are cut from strip material by the use of my invention, and Figure 11 is a view similar to Figure 10 but illustrating a prior art manner of cutting transformer laminations from strip material.

Referring first to Figure 9, wherein a conventional transformer core is fragmentarily shown, it is to be understood that the present invention is particularly, although not necessarily, adapted to cut generally keystone shaped transformer laminations T which are adapted to be assembled in the manner shown to form a transformer core. As will later be described, my invention is adapted to cut the laminations from strip material with a minimum of scrap (see Figure 10).

As seen in Figure 1, the apparatus therein illustrated which embodies my invention comprises apparatus 10 which is adapted to cut the laminations T and apparatus 11 which is adapted to feed strip material S to apparatus 10.

In the present embodiment, apparatus 10 comprises a suitable press 12 having the usual bed 13 and the usual ram 14 (see Figures 2, 7 and 8). The press 12 is herein shown to be of the inclined bed type for a purpose which will later become clear and secured to the bed 13 in spaced-apart relation by any suitable means is a pair of dies 15, 16 which are adapted to cut the strip material S.

As shown in Figure 7, die 15 comprises a lower plate 17 suitably secured to the bed 13 of the press 12 and an upper plate 18 guided for movement toward and away from the lower plate by the usual die pins 19. Springs 20 are positioned about the pins 19 and these springs yieldably urge the upper and lower portions of the die apart as shown. The lower plate 17 of the die supports a stationary cutting blade 21 and the upper plate 18 supports a movable cutting blade 22. It will readily be apparent that as the die plates are moved together by the press ram 14, blades 21, 22 will sever the strip S.

Die 16 is similar to die 15 and similar parts are therefore identified by the same reference numerals but with the suffix "a" added. However, it will be noted that the cutting blades 21a, 22a of die 16 (see Figure 6) are arranged to square off a part of the end of the lamination so as to form it to the shape shown in Figures 9 and 10.

Means are provided for guiding the strip S intermediate the spaced-apart dies 15, 16 and as shown in Figure 7 such means may comprise a plate-like member 23 which extends between the lower plates 17, 17a of the respective dies and whose upper surface lies in the same plane as the upper surface of the respective lower plates.

A presser plate 24 is supported in spaced relation above the plate 23 and the respective upper surfaces of the lower plates 17, 17a of the dies and extends between the movable knives 22, 22a for a purpose to be shown. Plate 24 has guide pins 25 secured thereto and certain of these pins are slidable in respective upper plates of the dies and certain other pins are slideable in brackets 26 which depend from the ram 14 of the press. Springs 27 surround the pins 25 and such springs yieldably urge plate 24 toward plate 23 to clamp the strip therebetween when the ram 14 descends.

It will be noted that the springs 27 adjacent brackets 26 are spaced from the brackets in the position of parts shown in Figure 7. This space is provided so that all of the springs 27 will be compressed substantially simultaneously as the ram descends. Any suitable means may be employed to maintain the presser plate 24 spaced from the lower plate of the dies and the plate-like member 23 when the dies are open. For example, the pins 25 which are slideable in the upper plates of the dies may have heads 25a which seat in counterbores 25b formed in the respective upper plates of the dies.

Means are also provided for locating the edge of the strip S transversely of the dies 15, 16 and such means are presently shown to comprise a plurality of locating pins 28 positioned, in the embodiment disclosed, in a straight line along one side of the strip (see Figures 6 and 8). At the present time, three locating pins are employed, one adjacent each pair of cutting knives and one intermediate the dies. As will be understood, pins 28 are shiftable from the extended position shown in Figure 8 wherein they are engageable with the strip S to a retracted position wherein they are clear of the strip and such shifting movement may be accomplished by any suitable means such as by means of fluid cylinders 29.

As also seen in Figures 6 and 8, means are provided for urging the strip material into engagement with each of the locating pins 28 and such means may comprise plungers 30 which are presently shiftable toward and away from the strip by means of fluid cylinders 31. As best shown in Figure 6, each plunger 30 is preferably in opposed relation with the respective pin 28 and each is movable by its respective cylinder with sufficient force to urge the strip material into engagement with each of the locating pins to thereby straighten the strip material in the event it is cambered.

Operation of apparatus 10 thus far disclosed will now be described. Assuming that the respective upper and lower plates of the dies 15, 16 are separated as shown in Figures 7 and 8 and that the pins 28 are extended and plungers 30 retracted as shown in Figure 8, a piece of strip S will be fed between the dies by means later to be disclosed.

The strip will be guided longitudinally on one edge by means of the pins 28 and on the other edge by means of a shoulder 32 which extends upwardly from and forms a part of guide plate 23.

After the strip has been positioned between the dies, cylinders 31 will be actuated to move plungers 30 into engagement with the edge of the adjacent strip portion. This will crowd the strip portion into engagement with each of locating pins 28 and thus remove any camber which may exist in such portion.

The press 12 will now be actuated to move ram 14 toward the bed of the press. As the ram 14 engages the respective upper plates of the dies 15, 16 and moves them downwardly toward their respective lower plates, presser plate 24 will first engage the adjoining side of the strip portion and firmly clamp such portion against the upper surface of the lower plates of the dies 15, 16 and the upper surface of the plate 23. This will straighten out the strip and insure accurate cutting thereof.

Continued movement of the ram 14 will cause each die to sever its respective end of the strip portion substantially simultaneously, and retraction of the ram will permit the dies to once again spring open. Pins 28 will then be retracted by cylinders 29 and this will permit the severed portion of strip (now cut to form a lamination T) to fall from the dies since the press is of the inclined type. The pins 28 will then be extended by cylinders 29, the plungers 30 retracted by cylinders 31 and the strip fed between the dies once again.

Normally, if the strip were fed to the apparatus 10 in the conventional manner, considerable waste strip would result (see portions W in Figure 11). However, the present invention reduces to a minimum the amount of scrap formed by turning the strip side for side about its longitudinal axis intermediate each cutting operation.

Referring once again to Figure 1 wherein apparatus 11 for feeding the strip to the press 12 and for turning the strip in the manner mentioned is illustrated, it will be seen that such apparatus comprises a barrel-like structure 33 which is rotatably supported by flanged rollers 34 which are rotatably carried by respective roller supports 35.

As shown in Figures 1 and 4, strip feeding means 36 is suitably supported within the structure 33 and such means is preferably, although not necessarily, of the type disclosed in my co-pending application for Letters Patent, Serial Number 374,903, entitled Mechanical Movement Particularly For Feed Apparatus. Such feeding means comprises juxtaposed rolls 37, 37 which provide a pass for the strip material and which are adapted to be rotated by means such as disclosed in the aforementioned co-pending application to feed a predetermined length of strip through the pass. It should be sufficient to disclose that the rolls 37, 37 grip the strip tightly and are adapted to be rotated a predetermined amount and thereafter stopped so as to firmly hold the strip in position. It is to be understood, however, that the particular feeding means herein shown is disclosed for purpose of illustration only and that any other suitable feeding means may be employed.

The strip S is adapted to be guided through the center, or axis of rotation, of the structure 33 to the feeding means 36 by means of rolls carried by spaced-apart rolls stands 38 and 39. As best seen in Figure 3, rolls 40, 40 provide a pass for the strip and are rotatably supported by the roll stand 38 in any suitable manner.

In order to prevent excessive twisting of the strip, the rolls 40, 40 are so positioned that the pass provided thereby holds the strip in a position which is normal to the position of the strip when it is aligned with the dies of the press 12 (compare Figures 2 and 3). In this manner, although the strip is turned from side to side about its longitudinal axis through an angle of 180 degrees by means to be disclosed, the strip will be twisted through an angle of only 90 degrees in either direction with respect to the position in which it is supported by the rolls 40, 40.

Furthermore, since the present invention is adapted for use with strip which requires particularly gentle handling, the amount that the strip is twisted, the width of the strip and the length of strip through which such twisting occurs preferably is so proportioned that the stresses set up in the strip by such twisting are within the elastic limit of the strip.

Roll stand 39 is similar to roll stand 38 in that it rotatably supports a pair of rolls which provide a pass for the strip. However, in the present embodiment, the axes of the rolls carried by roll stand 39 and the pass provided by the rolls are horizontal.

As shown in Figures 1, 4 and 5, roller supports 35 are secured to a slide 41 which is slidable in a guideway 42 supported by the floor or other supporting surface. For a purpose to be disclosed, means are provided for shifting the slide and its supported structure 33 longitudinally of the axis of the strip and such means presently comprises a fluid cylinder 43 (see Figure 1) secured to the slide 41 and having a piston rod 44 which is anchored to the floor or other supporting surface by means of a suitable bracket 45. Reciprocation of cylinder 43 relative to the piston contained therein will effect reciprocation of the slide 41, structure 33 and the feeding mechanism 36 carried thereby.

Means are provided for effecting rotation of structure 33 about its axis and the coinciding longitudinal axis of the strip and such means comprise a sprocket 46 supported at one end of the structure by suitable supports 47. A chain 48 has an intermediate portion trained over sprocket 46 and end portions trained over respective sprockets 49 which are supported by respective brackets 50 secured to slide 41 (see Figure 5). Each end portion of chain 48 is also trained over respective sprockets 51 each of which is rotatably secured to a respective end of a piston rod 52 which extends from opposite ends of a fluid cylinder 53. Fluid cylinder 53 is secured to the slide 41 by any suitable means and each extreme end of chain 48 is anchored to a respective adjoining bracket 50 by any suitable means.

When piston rod 52 is shifted to the right as viewed in Figure 5, chain 48 will effect rotation of structure 33 in the direction of the arrow. Since sprocket 46 is in the form of a ring, strip may be passed through the center thereof without interfering with rotation of the sprocket.

Operation of the present invention is as follows: Strip S will be fed between the rolls carried by roll stand 39, then between the rolls 40, 40 carried by roll stand 38, through the center of sprocket 46 and to the feeding means 36. The feeding means will then be actuated by any suitable means to feed a predetermined length of strip to the open dies 15, 16 of the press 12 and operation of the press will thereupon be initiated to sever the strip as heretofore described.

After the press has completed its cycle and a piece has been severed from the strip, the severed piece will fall from the dies as previously described and cylinder 43 will be actuated to shift structure 33 in a direction away from the press from the full line position shown in Figure 1 to the dot-dash line position. It is to be understood that such movement of structure 33 will withdraw the end of the strip from the die 15 for a purpose to become clear since the strip is tightly gripped by the rolls 37, 37 of the feeding means 36.

After cylinder 43 has shifted structure 33, any suitable means may be employed to effect operation of cylinder 53 to rotate structure 33 an amount sufficient to turn the strip side for side about its longitudinal axis. Since the strip has been withdrawn from the die 15, it may be freely turned. After the strip has been turned, cylinder 43 will return structure 33 to its full line position and feeding means 36 will operate to feed another predetermined length of strip to the press.

It is to be understood that the amount of material fed at each operation of the feeding means is sufficient to extend only a slight amount beyond the cutting knives 21a, 22a of die 16 to minimize scrap. By way of example, sufficient strip may be fed at each operation of the feeding means to extend approximately one-eighth of an inch beyond the knives of die 16. This is indicated in Figure 10.

It will now be clear that turning the strip side for side intermediate each cutting operation permits the cut made by die 16 to be positioned close to and parallel with the cut made by die 15 at the preceding press operation to thereby minimize scrap.

While it is preferable in the presently disclosed embodiment to employ two dies for cutting the strip material in order to insure cutting accuracy, it will be understood that under certain circumstances it may be desirable to employ only one die. In such event, turning the strip side for side intermediate each cutting operation will reverse the relationship of the cut end of the material and the cutting die and will permit generally keystone shaped pieces to be cut with a single die.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. The method of cutting accurately sized generally keystone shaped pieces from strip material while minimizing the amount of scrap formed, which comprises positioning the leading portion of the strip material in operative relation with a pair of spaced oppositely angled severing means, substantially simultaneously operating both severing means to cut the keystone piece from the leading portion of the strip, and thereafter turning at least the then leading portion of the strip material side for side about its longitudinal axis prior to severing the next piece therefrom.

2. The method of cutting accurately sized generally keystone shaped pieces from strip material while minimizing the amount of scrap formed, which comprises positioning the leading portion of the strip material in operative relation with a pair of spaced oppositely angled severing means, substantially simultaneously operating both severing means to cut the keystone piece from the leading portion of the strip, turning at least the then leading portion of the strip material side for side about its longitudinal axis, and advancing the strip material longitudinally to again position it in operative relation with the severing means.

3. The method of cutting accurately sized generally keystone shaped pieces from strip material while minimizing the amount of scrap formed, which comprises advancing the strip material longitudinally to position its leading portion in operative relation with a pair of spaced oppositely angled severing means, substantially simultaneously operating both severing means to cut the keystone piece from the leading portion of the strip, retracting the strip material from the severing means, turning at least the then leading portion of the strip material side for side about its longitudinal axis, and advancing the strip material once again to operative relation with the severing means.

4. Apparatus for cutting strip material, comprising cutting means intermittently operable to cut said strip material into pieces of shorter length, feed means including a pair of juxtaposed feed rolls in gripping engagement with said strip and operable to intermittently feed a predetermined length of strip to operative relation with said cutting means, means for shifting said feed means and consequently the strip gripped thereby in a direction to move the end of said strip toward and away from said cutting means, and means providing for rotation of said feed means in alternate directions about the longitudinal axis of said strip so as to shift said strip side for side about its longitudinal axis intermediate the cutting operations of said cutting means.

5. The method of cutting accurately sized generally keystone shaped pieces from strip material while minimizing the amount of scrap formed, which comprises positioning the leading portion of the strip material in operative relation with a pair of longitudinally spaced angularly disposed severing means, substantially simultaneously operating both severing means to cut the keystone piece from the leading portion of the strip, turning at least the then leading portion of the strip material side for side about its longitudinal axis, and advancing the strip material longitudinally an amount to position it in operative relation with the pair of severing means.

6. Apparatus for cutting strip material, comprising a pair of spaced-apart cutters intermittently and substantially simultaneously operable to cut said strip material into pieces of shorter length, said cutters being angularly disposed so that each severed piece is generally of keystone shape, feed means operable to intermittently feed a predetermined length of strip to operative relation with said cutters, and means for bodily turning said feed means about the longitudinal axis of said strip to shift the latter side for side about its longitudinal axis intermediate the cutting operations of said cutters.

7. Apparatus for cutting strip material, comprising a pair of spaced-apart cutters intermittently and substantially simultaneously operable to cut said strip material into pieces of shorter length, said cutters being angularly disposed so that each severed piece is generally of keystone shape, means for intermittently feeding a predetermined length of strip to operative relation with said cutters, means for shifting said strip side for side about its longitudinal axis intermediate the cutting operations of said cutters, and means for withdrawing said strip from a position adjacent one of said cutters an amount sufficient to provide for free side for side shifting of said strip and for returning said strip to its position adjacent said one cutter following such side for side shifting.

8. Apparatus for cutting strip material, comprising a pair of spaced-apart cutters intermittently and substantially simultaneously operable to cut said strip material into pieces of shorter length, said cutters being angularly disposed so that each severed piece is generally of keystone shape, feed means for gripping said strip and operable to intermittently feed a predetermined length of strip to operative relation with said cutting means, means providing for rotation of said feed means about the longitudinal axis of said strip to shift the latter side for side about its longitudinal axis intermediate the cutting operations of said cutters, and means for moving said feed means together with the strip gripped thereby in a direction to withdraw said strip from a position adjacent one of said cutters an amount sufficient to provide for free side for side shifting of said strip and for moving said feed means together with the gripped strip in the opposite direction to return said strip to its position adjacent said one cutter following such side for side shifting.

9. In the art of automatically cutting a length of strip material into successive pieces having cut ends of opposite angularity, the method of reducing the amount of scrap between adjacent cuts in the length of strip material which comprises passing the strip between a pair of feed rolls to mechanically feed the strip longitudinally and dispose its leading end in cutting relation with a cutting device which is positioned for operation at an angle to the longitudinal axis of the strip, interrupting the feed of said feed rolls while gripping the strip therebetween and actuating said cutting device to transversely cut off a portion of said strip at a place inwardly of said leading end, bodily rotating said feed rolls to turn said strip side for side about its longitudinal axis, and again establishing feed of said feed rolls to mechanically feed the strip to cutting relation with said cutting device for subsequent cutting operation.

10. In the art of automatically cutting a length of strip material into successive pieces having cut ends of opposite angularity, the method of reducing the amount of scrap between adjacent cuts in the length of strip material which comprises passing the strip between a pair of feed rolls to mechanically feed the strip longitudinally and disposed its leading end inwardly of a cutting device and in cutting relation with a cutting member which is positioned for operation at an angle to the longitudinal axis of said strip, interrupting the feed of said feed rolls while gripping the strip therebetween, bodily retracting said feed rolls to withdraw said strip from the cutting device, bodily rotating said feed rolls to turn said strip side for side about its longitudinal axis, and again establishing feed of said feed rolls to mechanically feed the strip to cutting relation with said cutting device for subsequent cutting operation.

11. Apparatus for cutting strip material, comprising cutting means intermittently engageable with the strip to effect successive cutting thereof, feed means for longitudinally advancing said strip to said cutting means, said feed means being bodily rotatable about the longitudinal axis of the strip for rotating said strip on its longitudinal axis, and means for rotating said feed means between successive cutting operations.

References Cited in the file of this patent
UNITED STATES PATENTS

| | | |
|---|---|---|
| 467,316 | Talcott | Jan. 19, 1892 |
| 1,871,334 | McNeill | Aug. 9, 1932 |
| 2,017,752 | Fisher | Oct. 15, 1935 |
| 2,168,358 | Lyon | Aug. 8, 1939 |
| 2,269,714 | Fenton | Jan. 13, 1942 |
| 2,354,294 | Schimmel | July 25, 1944 |
| 2,648,381 | Engel | Aug. 11, 1953 |
| 2,656,293 | Huch | Oct. 20, 1953 |

FOREIGN PATENTS

| | | |
|---|---|---|
| 3,007 | Great Britain | 1898 |
| 394,428 | Great Britain | June 29, 1933 |
| 714,314 | Great Britain | Aug. 25, 1954 |